W. M. HARD.
TROLLEY GUARD.
APPLICATION FILED APR. 23, 1910.
1,060,451.
Patented Apr. 29, 1913.
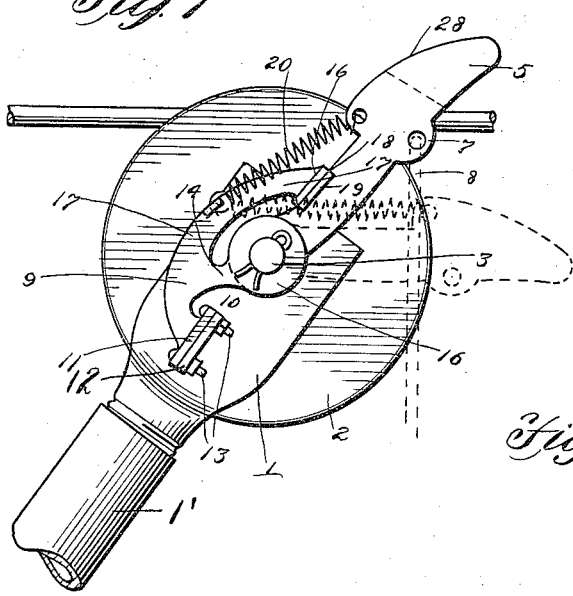
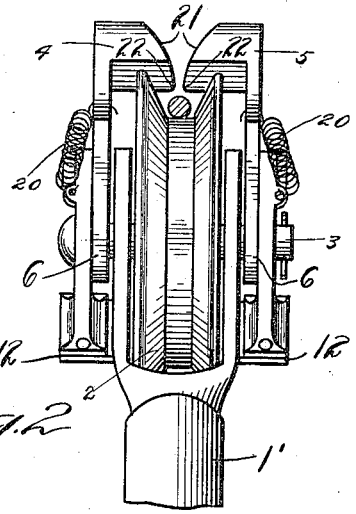
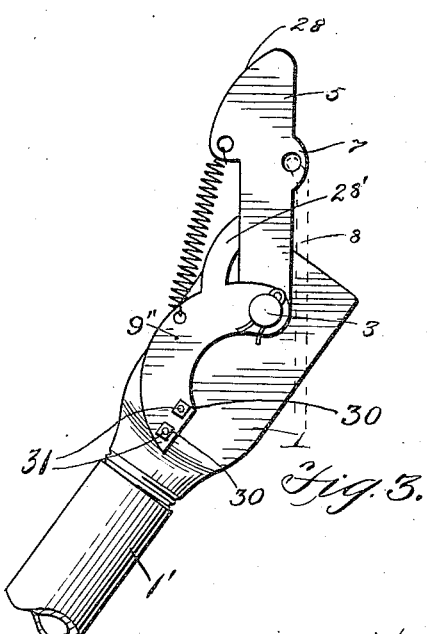
Witnesses
N. Abramson
M. L. Lowe
Inventor
Walter M. Hard
Woodward & Chandler
Attorney

UNITED STATES PATENT OFFICE.

WALTER M. HARD, OF CENTERVILLE, MARYLAND.

TROLLEY-GUARD.

1,060,451.

Specification of Letters Patent. Patented Apr. 29, 1913.

Application filed April 23, 1910. Serial No. 557,210.

*To all whom it may concern:*

Be it known that I, WALTER M. HARD, a citizen of the United States, residing at Centerville, in the county of Queen Annes and State of Maryland, have invented certain new and useful Improvements in Trolley-Guards, of which the following is a specification.

This invention relates to improvements in trolley guards, and has for its principal object to provide a guard that is simple, cheap and efficient in its operation.

Another object is the provision of a trolley guard which will easily pass the cross supports of the trolley wire.

A still further object is to provide a device of the class described which includes means to prevent the guard going too high above the wire.

With these and other objects in view, the present invention consists in the construction, combination and arrangement of the several parts as will be more fully described and pointed out in the claims, hereinafter, but it will be understood that such changes may be made in the specific structure as to be within the scope of the claims, without departing from the spirit of the invention.

In the accompanying drawing, in which is illustrated my invention, and which forms a part of this specification, Figure 1 is a side elevation of a trolley wheel and harp showing one form of my invention applied thereto. Fig. 2 is a front elevation of the device as shown in Fig. 1. Fig. 3 is another form of fastening for the stop member.

Referring now to the drawing in which is illustrated my invention, 1 represents the harp of a trolley arm, and 2 the wheel mounted therein on the shaft 3.

My improved guard is composed of the two sections 4 and 5, and are mounted on the outer ends of the shaft 3 by means of the eyes 6. About midway between the ends of the sections 4 and 5 are formed the apertured projections or lugs 7, to which the trolley rope 8 is attached. In the form shown in Fig. 1, an arm 9 or stop member is secured to the trolley arm or pole 1 at 10, by means of the foot 11, and the flat portion 12, through which are passed the bolts 13. This stop member 9 has the branch 14, which is formed on its forward end with an apertured enlargement 16 adapted to be mounted on the shaft 3. Extending upwardly and rearwardly toward the guard sections 4 and 5 are the arms 17 which have the flat bearing surfaces 18 on the extremities adapted to engage the lugs 19 formed on the said guard sections. These engaging members 18 and 19 serve to limit the upward movement of the guard. A coil spring 20 arranged on each side of the wheel and secured at one end to the guard, and at its other end to the arm 17, tends to keep the guard sections pulled upward toward the trolley wire. The upper portions of the guard sections or fingers 4 and 5 are inclined downwardly and inwardly toward each other as at 21, for the purpose of facilitating the guiding of the wire to the wheel. The shoulders 22 formed below the inclined portions 21 overlie the wheel and effectively prevent the escape of the wheel from the wire.

Besides being inclined toward each other the upper ends of the guard fingers are inclined rearwardly at 28 so as to provide a slanting face to engage the cross supports of the wire. This will allow the guard to easily pass the supports without any knock or jar.

From the foregoing it will be seen that I have provided a very simple and efficient device of this character, and one which is easily manipulated and which is comparatively cheap to manufacture. Also the device may readily be applied to the trolley pole and harp in common use.

In the modification shown in Fig. 3, the stop member 9″ is apertured as is also the harp, to receive the bolts 31, firmly affixing the stop member to the harp. Stop arms 28′ extend upwardly and rearwardly, and are adapted to have the fingers 4 and 5 abut thereagainst.

What is claimed is:

1. The combination with a trolley harp having a shaft, of a trolley guard comprising guard fingers pivotally mounted on the shaft of the trolley harp, laterally projecting lugs on the harp, arcuate plates, each of said plates having an apertured projection loosely mounted on said shaft, one end of each of said plates being secured to one of each of said lugs, and means on one end of each of said plates for engagement with one of the guard fingers.

2. The combination with a trolley harp having a shaft, of a trolley guard comprising guard fingers mounted on the shaft of the trolley harp, inwardly projecting portions on said fingers overlying the trolley wheel, a stop member mounted on the said shaft on each side of the harp and secured at one end to the harp, and a foot on one end of each of said stop members adapted to engage the finger.

3. In combination with a trolley harp having a shaft, a trolley guard comprising guard fingers mounted on the shaft of the trolley harp, inwardly projecting portions having their lower faces normally inclined upwardly with respect to the direction of travel and overlying the trolley wheel, a stop member comprising curved plates disposed on opposite sides of the harp, means for securing one end of each of the plates to the harp, a projection on each of the curved plates, having an eye mounted on said shaft, and a foot on one end of each of the curved plates for engagement with the fingers to limit their pivotal movement in one direction.

4. In combination with a trolley harp having a shaft, guard fingers mounted on the shaft, arcuate plates loosely secured to the said shaft one end of each of the arcuate plates being rigidly secured to the harp, curved feet formed on the said arcuate plates for engagement with the said guard fingers, and coil springs secured at one of their ends to the guard fingers and at their other ends to the curved feet, and tending to normally draw the fingers toward the projections.

In testimony whereof I affix my signature in presence of two witnesses.

WALTER M. HARD.

Witnesses:
R. BASCOM EATON,
RALPH G. PLUMMER.

---

Copies of this patent may be obtained for five cents each, by addressing the "Commissioner of Patents, Washington, D. C."